United States Patent
Cai

(10) Patent No.: US 6,508,770 B1
(45) Date of Patent: Jan. 21, 2003

(54) APERTURE COMPOUNDING FOR MEDICAL IMAGING

(75) Inventor: Anming He Cai, San Jose, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/801,952

(22) Filed: Mar. 8, 2001

(51) Int. Cl.⁷ .................................................. A61B 8/00
(52) U.S. Cl. ...................................................... 600/447
(58) Field of Search ......................... 600/437, 441–447; 73/625, 626; 367/7, 11, 130, 138

(56) References Cited

U.S. PATENT DOCUMENTS

| | | |
|---|---|---|
| 4,649,927 A | 3/1987 | Fehr et al. |
| 5,111,824 A | 5/1992 | Lazenby et al. |
| 5,462,057 A | 10/1995 | Hunt et al. |
| 5,568,813 A | 10/1996 | Deitrich et al. |
| 5,579,770 A | 12/1996 | Finger |
| 5,669,387 A * | 9/1997 | Mine ........................... 600/441 |
| 5,673,700 A * | 10/1997 | Yamazaki et al. .......... 600/441 |
| 5,675,554 A | 10/1997 | Cole et al. |
| 5,908,390 A | 6/1999 | Matsushima |
| 6,014,897 A * | 1/2000 | Mo ............................. 367/135 |
| 6,104,670 A | 8/2000 | Hossack et al. |
| 6,126,598 A | 10/2000 | Entrekin et al. |
| 6,174,286 B1 | 1/2001 | Ramamurthy et al. |
| 6,277,075 B1 * | 8/2001 | Torp et al. ................... 600/443 |

* cited by examiner

Primary Examiner—Marvin M. Lateef
Assistant Examiner—Ali M. Imam

(57) ABSTRACT

Speckle is reduced by compounding data associated with different aperture positions. The data is responsive to transmission and reception along the same scan lines. The data is detected and then combined.

25 Claims, 2 Drawing Sheets

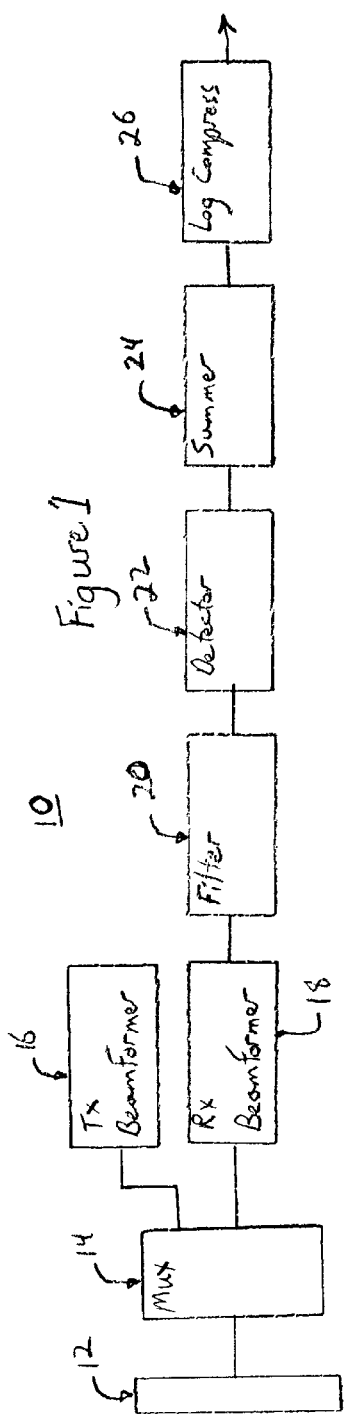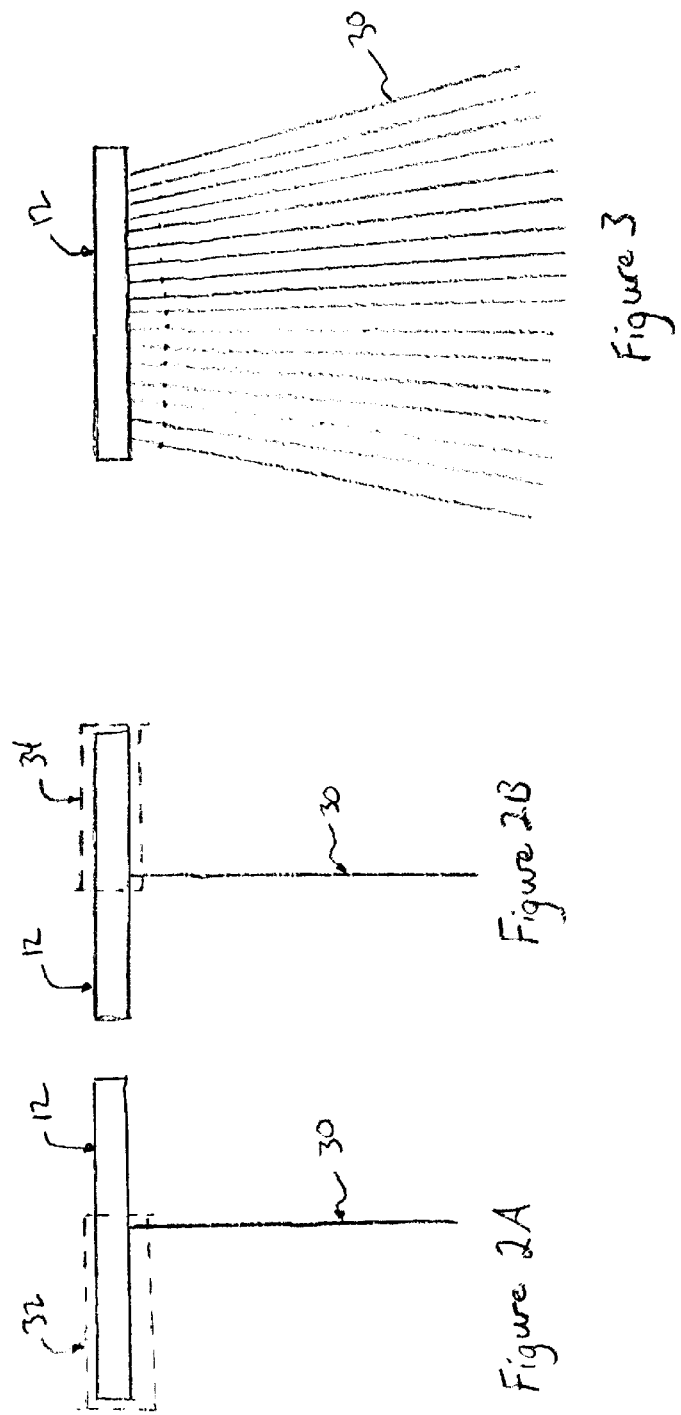

APERTURE COMPOUNDING FOR MEDICAL IMAGING

BACKGROUND

This invention relates to imaging with a compound aperture. In particular, speckle reduction is provided by imaging with the compound aperture.

Speckle noise is generated in images associated with phased arrays. Speckle varies as a function of various imaging parameters. For example, speckle varies as a function of temporal frequency and spatial frequency. As a result, speckle is reduced by compounding temporal frequencies (frequency compounding) and spatial frequencies (spatial compounding). For example, image information responsive to two different frequencies is compounded. Compounding the image information averages or reduces the speckle contribution for the resulting image.

One method of spatial compounding uses different steering angles or scan line angles. Two different sets of image information representing a same general or overlapping area are acquired. Each set is responsive to a different steering angle. For each given spatial location, data is acquired in response to transmissions and receptions along a scan line that intersects the location at different angles. The sets of data associated with a common or overlapping region are compounded to reduce speckle. Each frame of data is acquired before the steering angle is changed for acquiring another frame of data, resulting in registration errors for moving objects or associated with movement of a transducer. Speckle reduction may not be provided for non-overlapping areas of the two images.

BRIEF SUMMARY

The present invention is defined by the following claims, and nothing in this section should be taken as a limitation on those claims. By way of introduction, the preferred embodiment described below includes a method and system for imaging with a compound aperture.

Using the same scan lines, different transmit and/or receive apertures are used to obtain data. Speckle patterns associated with different transmit or receive apertures decorrelate. By compounding the obtained data, speckle noise maybe reduced.

In one aspect, a method for imaging with a compound aperture is provided. First data representing a first scan line in response to a first aperture is obtained. Second data representing the first scan line and responsive to a second aperture is obtained. A center of the second aperture is at a different position along an array of elements than a center of the first aperture. The first and second data is detected and then combined.

In a second aspect, another method for imaging with a compound aperture is provided. First and second data representing a same plurality of scan lines is obtained. The first and second data is obtained without purposeful movement of the transducer. The first and second data are detected and then combined. An image is generated from the combined data where the image represents the plurality of scan lines. The first and second data are responsive to a same focal depth and apertures with different positions.

In a third aspect, a system for imaging with a compound aperture on a transducer array of a plurality of elements is provided. A multiplexer is operable to sequentially set first and second apertures for a first scan line. A center of the second aperture is at a different position along the transducer array than a center of the first aperture. A detector detects the first and second data responsive to the first and second apertures, respectfully. A summer combines the first and second detected data.

Further aspects and advantages of the invention are discussed below in conjunction with the preferred embodiments. These further aspects are claimed or maybe later claimed.

BRIEF DESCRIPTION OF SEVERAL VIEWS OF THE DRAWINGS

FIG. 1 is a block diagram of one embodiment of a portion of an ultrasound system for imaging with a compound aperture.

FIGS. 2A and 2B are graphical representations of embodiments of left half and right half apertures for scanning a same scan line.

FIG. 3 is a graphical representation of a scan format of one embodiment.

DETAILED DESCRIPTION OF THE PREFERRED EMBODIMENTS

Figure 4:
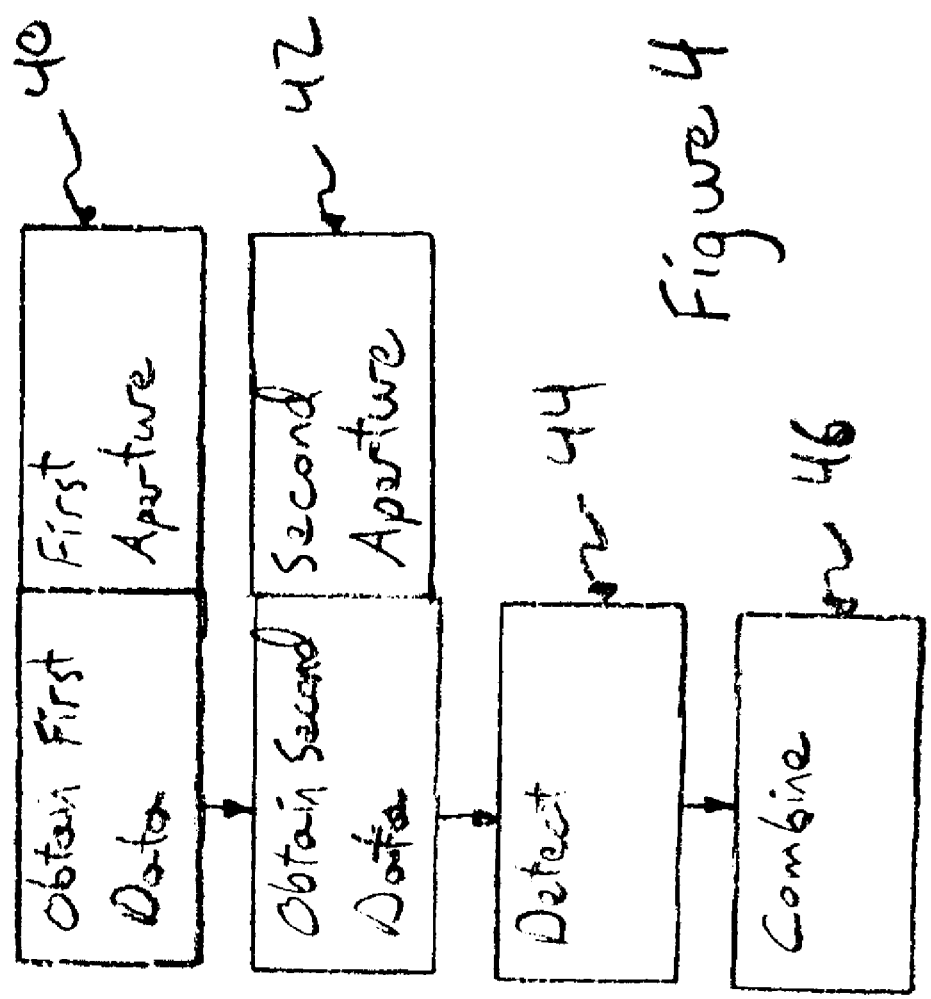
FIG. 4 is a flow chart diagram representing one embodiment of a method for imaging with a compound aperture.

Apertures at different positions along the transducer array are used to acquire two or more respective sets of data. Each set of data is associated with substantially the same scan lines. The sets of data are compounded after detection to reduce speckle in an image. By using the same scan lines, transmissions for each set of data may be interleaved for consecutive line firings, for groups of line firings or as a function of firings for an entire frame. Using line interleaving, registrations errors associated with moving objects or moving the transducer may be reduced or avoided.

FIG. 1 shows one embodiment of a portion of a medical diagnostic ultrasound system 10. The system 10 includes a transducer 12, a multiplexer 14, a transmit beamformer 16, a receive beamformer 18, an optional filter 20, a detector 22, a summer 24 and a log compressor 26. Additional, fewer or different components may be provided. In one embodiment, the system 10 comprises a 128XP, Aspen, Sequoia or Cypress ultrasound medical diagnostic system manufactured by Acuson Corporation. Other ultrasound systems or other array based imaging systems may be provided.

The transducer 12 comprises an array of elements. 64, 128, more than 128, or other numbers of elements may be provided. Each element comprises a piezoelectric material, a microelectromechanical device, or other material for transducing between electrical and acoustical signals. The elements of the transducer 12 are arrayed as a one dimensional, 1.5 dimensional, two dimensional, annular or other array of elements. For example, a one-dimensional linear array is provided. Various linear arrays may be used, such as curved linear arrays with concave or convex shapes.

Various of the elements of the transducer 12 are selected for an aperture. An aperture comprises a group of elements, such as a group of adjacent elements. In alternative embodiments, an aperture comprises sets of elements separated by other elements that are not used within the aperture. The aperture defines the elements used for transmitting and/or receiving acoustic energy during a transmit or receive event.

For a compound aperture, different apertures are used for different transmit and/or receive events. For example, a left half aperture and a right half aperture are used for each of two consecutive transmit and receive events.

The elements used for an aperture are selected by the multiplexer 14. The multiplexer 14 comprises a plurality of switches for switching between transmit and receive events and for selecting elements within an aperture. Various switching configurations may be provided within the multiplexer 14. For example, the multiplexer disclosed in U.S. Pat. Nos. 5,675,554, 6,174,286 (U.S. Ser. No. 09/200,663, filed Nov. 29, 1998) or U.S. Pat. No. 6,436,047 (U.S. Ser. No. 09/723,048, filed Nov. 27, 2000), the disclosures of which are incorporated herein by reference, are used. Other multiplexers may be used, including transistor switches, analog switches, or other devices for selectably connecting two components.

During a transmit event, the multiplexer 14 connects the transmit beamformer 16 to the elements of the transducer 12 for a particular aperture. For receive events, the multiplexer 14 connects to the receive beamformer 18 to the elements of the transducer 12 for receiving signals from a selected aperture.

The transmit beamformer 16 comprises a plurality of waveform generators. For example, the transmit beamformer disclosed in U.S. Pat. No. 5,675,554, the disclosure of which is incorporated herein by reference, is used. Other transmit beamformers including analog or digital components may be used. The transmit beamformer 16 includes various delays and amplifiers for delaying and adjusting the amplitude of the waveforms relative to other waveforms. During a transmit event, transmit waveforms are generated by the transmit beamformer 16 for each element of the transducer 12 included within a selected aperture. The transmit waveforms are provided to the transducer 12 for substantially simultaneous transmission of acoustic energy along one or more scan lines. The transmitted waveforms are characterized by a transmit frequency band (i.e., a fundamental frequency band) and one or a plurality of focal points or a linear focal region.

The acoustic energy generated by the transducer 12 in response to the waveforms is focused along one or more scan lines. As the acoustic energy travels along the scan lines, tissue or fluid barriers reflect some of the acoustic energy back towards the transducer 12. During a receive event, the transducer 12 converts received acoustic energy into electric signals. The receive event includes reception of data along one or more scan lines in response to a single transmit event. The electrical signals pass through the multiplexer 14 to the receive beamformer 18.

The receive beamformer 18 comprises delays and summers for focusing the receive signals along one or more scan lines. For example, the receive beamformer comprises the receive beamformer disclosed in U.S. Pat. No. 5,685,308, the disclosure of which is incorporated herein by reference. Other receive beamformers, including analog or digital components, may be used. Relative delays are applied to receive signals from elements within the selected aperture. After delaying, the received signals are summed. Each summed signal represents a spatial location along the scan line.

In one embodiment, the receive beamformer 16 is operable to dynamically focus the receive signals. The delays applied to the received signals vary as a function of time, representing variation as a function of distance along the scan line.

The receive beamformer 18 generates the data representing the various scan lines in response to a plurality of transmit and receive events. The data comprises in-phase and quadrature data. In alternative embodiments, the data is formatted as radio frequency data.

The data is provided to an optional filter 20. The filter 20 comprises a digital signal processor, a general processor, an application specific integrated circuit, an analog filter or other devices for implementing a low pass, high pass or band pass filter. In one embodiment, the filter 20 comprises a demodulator and associated low pass or band pass filter for passing frequencies associated with a down shifted frequency. For example, energies at the frequency of interest are down shifted to be within the pass band of the filter. In alternative embodiments, the filter 20 comprises a band pass filter or series of high and low past filters for passing either of harmonic or fundamental frequencies and reducing or removing energies at other frequencies.

The filter 20 removes or reduces energies associated with other or undesired frequencies. For example, the filter 20 passes frequencies at a harmonic of the fundamental transmitted frequency band. As used herein, harmonic includes integer harmonics (e.g., $2^{nd}$, $3^{rd}$, $4^{th}$, . . . ), fractional harmonics (e.g., $\frac{3}{2}$, $\frac{5}{2}$ . . . ) or subharmonics (e.g., $\frac{1}{2}$, $\frac{1}{3}$, . . . ).

Filtered data associated with different apertures is passed through the detector 22. The detector 22 comprises a digital signal processor, general processor, application specific integrated circuit, analog circuitry, digital circuitry, and combinations thereof for detecting an envelope or a power associated with the obtained data. For example, the detector 22 comprises a B-mode detector. In alternative embodiments, the detector 22 comprises a Doppler or autocorrelation detector for detecting velocity, energy, power or variance associated with moving tissue or fluid.

The detected data associated with two or more apertures in different positions is provided to the summer 24. The summer 24 comprises a digital signal processor, a general processor, an application specific integrated circuit, an analog adder, a digital adder, or other device for summing two or more received signals, such as two or more signals associated with two or more different apertures, respectively. The summer 24 also includes a memory. The memory is operable to store data representing a single scan line, a plurality of scan lines, a frame of scan lines or an image, or data associated with a plurality of frames. The memory provides data associated with a point or region along one or more scan lines for addition with later acquired data representing the same point or region along the same scan line. Using the memory, sequentially acquired data associated with different aperture positions are summed. The size of the memory corresponds to the interleaving or frequency of changes between different aperture positions. Where the aperture position changes as a function of each scan line or group of scan lines, the memory is operable to store data for at least a scan line or a group of scan lines. Where three or more different aperture positions are used, the memory is operable to store data for at least two or more scan lines. In alternative embodiments, the memory is provided with the detector 22, the filter 20 or the receive beamformer 18. In yet other alternative embodiments, a parallel data path with or without a memory is provided for obtaining data and providing the data associated with different aperture positions to the summer 24.

The combined data output by the summer 24 is provided to the log compressor 26. The log compressor logarithmically reduces the dynamic range of the data. In alternative embodiments, the summer 24 is positioned after the log compressor 26, and detected, log compressed data is combined.

Different aperture positions are used for speckle reduction. Data associated with a same scan line but two or more different apertures are combined. FIGS. 2A and 2B are graphical representations showing different aperture positions. The transducer 12 transmits or receives acoustic energy focused along the scan line 30. For one transmit and/or receive event, a left aperture 32 as shown in FIG. 2A is used. For a subsequent transmit and/or receive event, a right aperture 34 as shown in FIG. 2B is used.

Apertures in different positions may include elements common to multiple apertures. For example, the left aperture 32 includes more than one-half of the elements of the transducer 12. Likewise, the right aperture 34 includes more than half the elements of transducer 12. A group of center elements are common to both the right and left apertures 34, 32. In alternative embodiments, one or more of the apertures comprises fewer than one-half of the elements with no or some common elements.

Each aperture has a center. The center of a continuous group of elements comprises the middle element or elements. For a non-continuous group of elements, the center comprises a center of distribution of the elements within the aperture. For apertures with different positions, the center of each aperture is at a different location along the array of elements. For example, the centers of the left and right apertures 32, 34 are spaced apart from each other. In this example, the centers of both apertures are spaced from the center of the transducer 12. In this example, the center of the left aperture 32 is on an opposite side of the center of the array of elements than the center of the right aperture 34. The center of the left and right apertures 32, 34 are closer to left and right edges of the transducer 12, respectively.

As shown in FIGS. 2A and 2B, the scan line 30 originates at the center of the array of elements. In alternative embodiments, the scan line 30 is associated with a different origin and/or angle. For these alternative embodiments, the center of the different apertures may still be on opposite sides of the center of the array and/or on opposite sides of the origin of the scan line. In yet other alternative embodiments, the center of each aperture used is on a same side of either the center of the transducer array or the origin of the scan line. In alternative embodiments, the center of two different apertures maybe closer to a same edge than another edge of the transducer array.

In the embodiment above, two different apertures associated with a right and left aperture position are used for transmitting, receiving or both transmitting and receiving acoustic energy. In alternative embodiments, different divisions of elements are provided. For example, one or more of the apertures with different positions comprise a non-continuous grouping of elements. As another example, one aperture is associated with a center grouping of elements, and another aperture or two apertures are associated with less centered grouping(s) of elements along the transducer array. Any of various groupings of elements may be used where the aperture has a different position or the center of the apertures are at different positions along the array.

Acoustic energy is transmitted in two or more transmit events. The acoustic energy is focused at a single or multiple depths. For receive events, the same or different apertures are used for receiving in response to each of the two transmit events.

In one embodiment, dynamic receive focusing is used. The focus applied to the received signals is changed as a function of time and associated depth along the scan line. As the receive focus changes, the aperture or the position of the aperture changes. In alternative embodiments, the aperture or position of the aperture is the same for different focal depths.

In one embodiment for dynamic receive focusing, the different apertures and/or centers of the different apertures become further apart or separate more with increasing depths. Alternatively or additionally, the center of the different apertures stays about the same, but one or more of the apertures increases in size (e.g., adding additional elements to one or both sides of the aperture) with an increasing depth of focus. In alternative embodiments, the differently positioned apertures become closer together or decrease in size with an increase in depth of focus. In yet other alternative embodiments, the differently positioned apertures are adjusted differently, such as one staying the same or getting smaller while the other becomes larger.

In one embodiment, the same apertures are used for a transmit and associated receive event. An aperture with a different position is subsequently used for a transmit and associated receive event. In alternative embodiments, different apertures are used for transmit than receive. In yet other alternative embodiments, two transmit events and one receive or two receive and one transmit event use a same aperture and a different aperture is used for one receive or transmit event, respectively. Where three or more series of transmit and associated receive events are used for combining detected data, a subset of the transmit and receive events may use a same aperture. Various combinations are possible.

In addition to varying the aperture, the apodization profile applied across the aperture may vary. Alternatively, the apodization profile is the same for each aperture. In one embodiment, the reduced contributions due to diffraction, increasing the acoustic path length and tissue attenuation are compensated through the apodization profile. The change between apodization levels may comprise a linear, parabolic, Gaussian, non-symmetric (e.g., one side parabolic and the other side a fourth order polynomial with a smooth transition between the two or other distribution function.

Obtaining sets of data associated with different aperture positions are repeated for each of a plurality of scan lines as shown in FIG. 3. A same or different focal depth or focal depths is used for each of the scan lines 30. The scan lines 30 may correspond to any scan pattern or format, such as Vector®, sector, linear or other formats. The differently positioned apertures used for each scan line may be different as a function of the origin and/or angle of the scan line. In alternative embodiments, the same apertures are used for two or more of the scan lines 30.

In order to scan a same region of a patient, the transducer 12 is maintained in one position. Movement of the transducer 12 due to breathing or moving of the patient or sonographer may occur but purposefully sliding the transducer or angling the transducer is avoided. In alternative embodiments, the transducer 12 is moved and the movement is accounted for through processing.

FIG. 4 shows a flow chart of one embodiment for imaging with a compound aperture. For one scan line, a first set of data is obtained in act 40 and a second set of data is obtained in act 42. The sets of data are detected and combined in acts 44 and 46, respectively. Additional sets of data associated with different apertures may be obtained, detected and combined. The process is repeated for each scan line or a subset of scan lines.

In act 40, a first aperture is positioned or selected for obtaining the first set of data. The first aperture is used for transmit, receive or both transmit and receive events. Acoustic energy is transmitted and echo signals are received to obtain the first set of data. The set of data is responsive to the first aperture.

In act 42, the second set of data is obtained in response to a second aperture. The second aperture is used for transmit, receive or both transmit and receive events. The second aperture is at a different position on the transducer array than the first aperture. The center of the second aperture is at a different position than the center of the first aperture in one embodiment. The second aperture may be associated with the same or different focal points than the first aperture. The first and second data sets are obtained sequentially in response to first and second transmit and associated receive events. In one embodiment, the transducer is maintained in one position without purposeful movement during acts 40 and 42. Additional sequential sets of data associated with additional different aperture positions may be obtained.

In act 44, each of the sets of data is detected. The detected data is combined in act 46 after the detection in act 44. Two or more sets of data associated with different aperture positions are combined. The sets of data may be weighted relative to other sets of data. For example, one set of data associated with another aperture is weighted to provide a greater or lesser contribution then another set of data associated with another aperture. Weights are applied to one, some or all the sets of data before or after detection. The weights may be selected as a function of the scan line position, the range or depth of focus, the intensity of the received data, other characteristics of the received data, characteristics of data associated with different spatial or temporal positions or other information.

An image is generated from the combined data. For example, an ultrasound image represents the region scanned by the system 10 (FIG. 1). Data along the plurality of scan lines is scan converted into a two-dimensional or three-dimensional data set for representation on a monitor or other display device. Speckle is reduced on the displayed image as a result of the combination of detected data associated with differently positioned apertures. Boundaries may be better detected and represented by using two or more apertures not parallel to the transducer face.

The above described method and/or system may be used with additional transmit and receive processes or data processes. For example, data sets are obtained by interoperating between received data associated with two different scan lines. As another example, acoustic energy is transmitted along adjacent scan lines with a different polarity or phasing, such as inverting the phases of the pulses. As even another example, multiple simultaneous transmit or receive beams may be used. As yet another example, a synthetic aperture may be used where data associated with different apertures is combined prior to detection. Examples of additional data processing include filtering, lowering of the dynamic range, edge enhancing or other processing applied to the data prior to or after compounding. As another example, video filtering and/or filtering associated with improving resolution and edge enhancement are provided.

While the invention has been described above by reference to various embodiments, it should be understood that many changes and modifications can be made without departing from the scope of the invention. It is therefore intended that the foregoing detailed description be understood as an illustration of the presently preferred embodiments of the invention and not as a definition of the invention. It is only the following claims including all equivalents that are intended to define the scope of this invention.

What is claimed is:

1. A method for imaging with a compound aperture, the method comprising the acts of:
   (a) obtaining first data representing a first scan line and responsive to a first aperture;
   (b) obtaining second data representing the first scan line and responsive to a second aperture, a center of the second aperture at a different position along an array of elements than a center of the first aperture;
   (c) detecting the first and second data; and
   (d) combining the first and second data after (c).

2. The method of claim 1 further comprising:
   (e) transmitting sequentially with the first and second apertures along the first scan line.

3. The method of claim 2 further comprising:
   (e) receiving sequentially with the first and second apertures along the first scan line.

4. The method of claim 1 further comprising:
   (e) receiving with the first and second apertures along the first scan line.

5. The method of claim 1 further comprising:
   (e) obtaining the first and second data responsive to first and second apodization profiles, respectively, the first apodization profile different than the second apodization profile.

6. The method of claim 5 wherein (e) comprises weighting a contribution of outer elements within each of the first and second apertures more than inner elements.

7. The method of claim 4 further comprising:
   (f) dynamically focusing during (e).

8. The method of claim 7 wherein (f) comprises moving the centers of the first and second apertures further apart with increasing depths.

9. The method of claim 7 wherein (f) comprises increasing the size of the first and second apertures with increasing depths.

10. The method of claim 1 further comprising:
    (e) reducing signals outside a harmonic band of a transmitted band from the first and second data prior to (c).

11. The method of claim 1 wherein (a) and (b) comprise obtaining the first and second data wherein the center of the first aperture is closer to a first edge of an array than the center of the second aperture.

12. The method of claim 11 wherein the first and second aperture include common elements.

13. The method of claim 1 further comprising:
    (e) off-setting the center of the first aperture from a center of the array in a first direction; and
    (f) off-setting the center of the second aperture from the center of the array in a direction opposite the first direction.

14. The method of claim 1 further comprising:
    (e) log compressing the first and second data after (c); wherein (d) occurs before (e).

15. The method of claim 1 further comprising:
    (e) obtaining third data representing the first scan line and responsive to a third aperture; wherein (d) comprises combining the first, second and third data.

16. The method of claim 1 further comprising:
    (e) log compressing the first and second data; wherein (d) occurs after (e).

17. The method of claim 1 further comprising:
    (e) relatively weighting the first and second data.

18. The method of claim 17 wherein (e) comprises relatively weighting as a function of scan line and range.

19. A method for imaging with a compound aperture, the method comprising the acts of:

(a) obtaining first data representing a plurality of scan lines;

(b) obtaining second data representing the plurality of scan lines without purposeful movement of a transducer array between (a) and (b), (a) and (b) each corresponding to transmission and reception events and the transmission and reception events of (b) performed subsequent to the transmission and reception events of (a);

(c) detecting the first and second data;

(d) combining the first and second data after (c); and (e) generating an image from the combined data, the image representing the plurality of scan lines;

wherein first and second data representing at least one of the plurality of scan lines is responsive to (i) a same focal depth and (ii) first and second respective apertures at different positions on the transducer array.

20. A system for imaging with a compound aperture on a transducer array of a plurality of elements, the system comprising:

a multiplexer operable to sequentially set first and second apertures for a first scan line, a center of the second aperture at a different position along the transducer array than a center of the first aperture;

a detector operable to detect first and second data responsive to the first and second apertures, respectively; and a summer operable to combine the first and second detected data.

21. The system of claim 20 further comprising a transmit beamformer wherein the multiplexer is operable to set the first and second apertures during first and second respective transmit events.

22. The system of claim 20 further comprising a receive beamformer wherein the multiplexer is operable to set the first and second apertures during first and second respective receive events.

23. The system of claim 22 wherein the receive beamformer is operable to dynamically focus during the first and second receive events.

24. The system of claim 23 wherein dynamically focusing comprises moving the first and second apertures further apart with increasing depths.

25. The system of claim 20 further comprising a filter operable reduce signals at a transmitted frequency band, the filter connected between the multiplexer and the detector.

* * * * *